April 11, 1967  B. L. DE MARE  3,314,076
RECORDER SPEED CHANGER
Filed Feb. 19, 1965  2 Sheets-Sheet 1
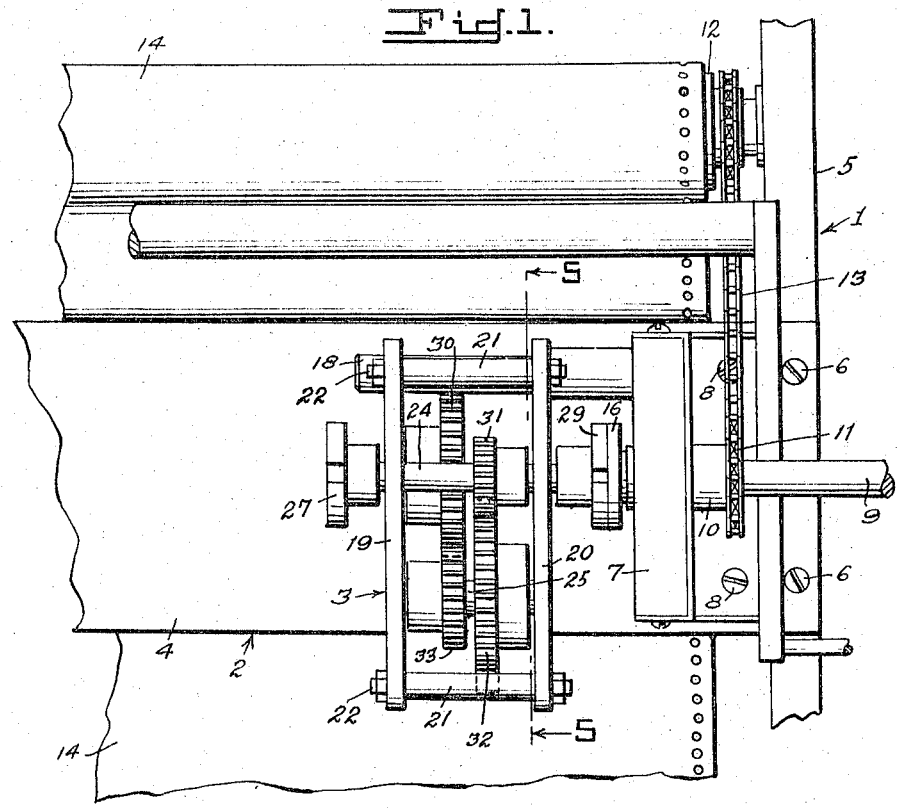
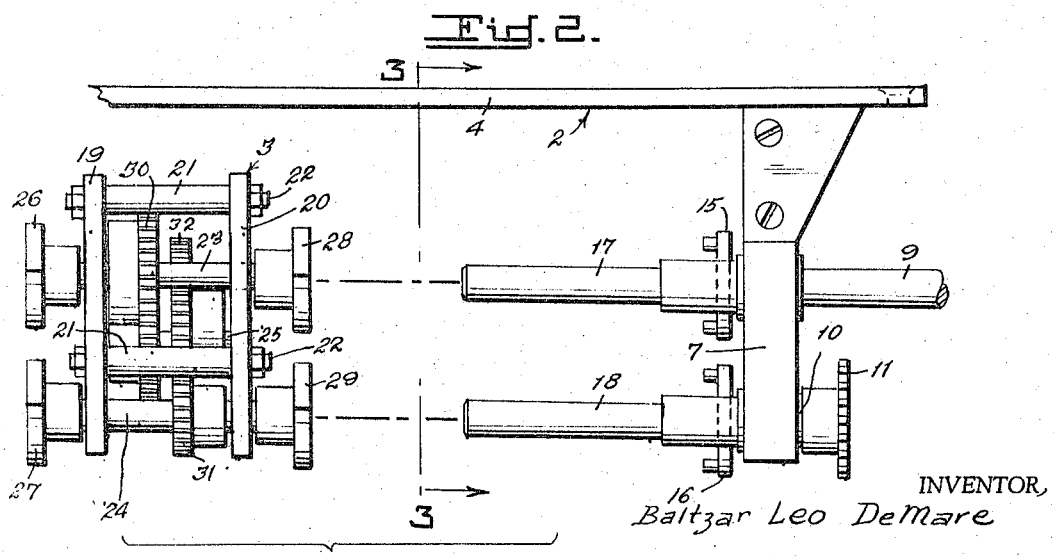
INVENTOR,
Baltzar Leo DeMare
BY: Harry M. Saragovitz,
Edward J. Kelly &
Herbert Berl  ATTORNEYS April 11, 1967 B. L. DE MARE 3,314,076
RECORDER SPEED CHANGER
Filed Feb. 19, 1965 2 Sheets-Sheet 2
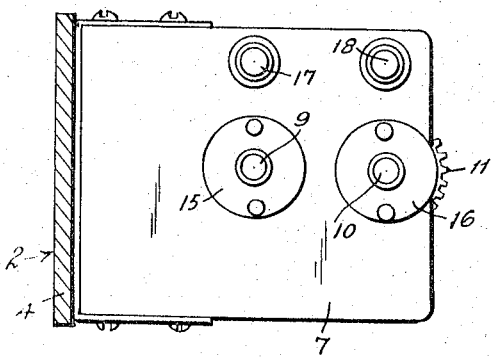
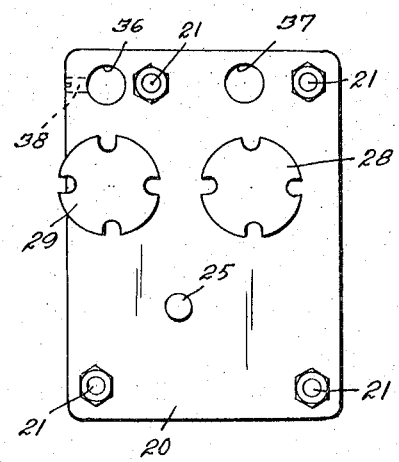
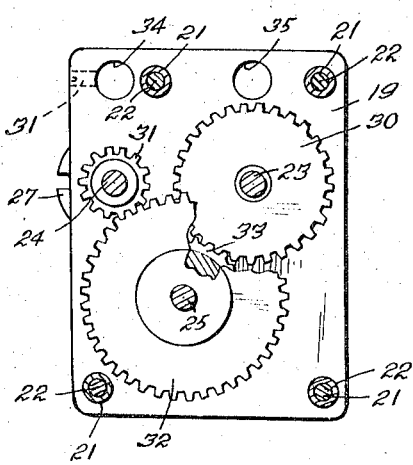
INVENTOR
Baltzar Leo DeMare
BY: Harry M. Saragovitz,
Edward J. Kelly &
Herbert Berl ATTORNEYS.

United States Patent Office 3,314,076
Patented Apr. 11, 1967

3,314,076
RECORDER SPEED CHANGER
Baltzar Leo De Mare, Aberdeen, Md., assignor to the United States of America as represented by the Secretary of the Army
Filed Feb. 19, 1965, Ser. No. 434,144
4 Claims. (Cl. 346—136)

The invention described herein may be manufactured and used by or for the Government for governmental purposes, without the payment to me of any royalty thereon.

This invention relates to a recorder speed changer and more particularly to a device for extending the chart speeds on a data recorder and similar machines.

The device may be attached with minimum modification to the recorder, and will permit the operator to quickly and easily change the chart speed of the recorder by merely substituting a box having a gear cluster of different ratio onto the input and output shafts of the chart drive mechanism of the recorder.

The gear box of the invention is capable of providing two gear ratios simply by removing the box from the input and output shafts, then reversing it and replacing it on the shafts.

It is a primary object of this invention to quickly change the speed of a chart driving mechanism of a recorder or like mechanism.

It is another object to change the speed of a recording machine without turning the machine off.

A further object is to change the speed of the chart drive mechanism of a recording machine by removing a gear box from the chart drive, reversing the box and replacing it thereon.

A still further object is to provide a gear box having means therein to provide two gear ratios.

A final object is to provide a means for changing the speed of a chart drive mechanism quickly and economically.

These and other objects and advantages of the present invention will be fully apparent from the following description when taken in connection with the annexed drawings in which:

FIG. 1 is a fragmentary elevational view of the chart drive of a recording mechanism showing the speed changing device of the invention and its position relative thereto;

FIG. 2 is an exploded view of the invention, the speed changer being detached from the chart mechanism and as viewed from the top;

FIG. 3 is a sectional view taken along line 3—3 of FIG. 2 and looking in the direction of the arrows;

FIG. 4 is an end view of the gear box; and

FIG. 5 is a cross sectional view taken along line 5—5 of FIG. 1 looking in the direction of the arrows.

Referring to the drawings, a chart drive of a recording mechanism is indicated by reference character 1, generally (FIG. 1).

The invention consists essentially of an adapter assembly generally indicated by 2 which is applied to the chart drive mechanism 1 with little modification, and of a speed changer indicated generally by 3.

The adapter 2 comprises a mounting plate 4 which may be attached to the supporting frame 5 of the recording mechanism 1 by screws 6. (The manner of mounting is shown by way of example only, as other means may be employed to be expedient since it will depend upon the necessary modification required.)

A bearing plate 7 is fastened to the mounting plate 1 by screws 8 and provides a bearing for two freely rotatable shafts, a drive shaft 9 and an idler shaft 10. Shaft 9 is connected with the chart drive gearing of the recorder mechanism (not shown). A sprocket 11 is attached to the outboard end of idler shaft 10 and sprocket 11 is connected to the chart roller 12 of the chart drive mechanism 1 by a chain 13. Roller 12 drives the chart 14.

Male elements 15 and 16 of pin and slot couplings are mounted on the inboard ends of shafts 9 and 10 respectively.

A pair of rods 17 and 18 are fixed to the inboard side of bearing plate 7, as best seen in FIGS. 2 and 3 and are for the purpose of mounting the speed changer, to be herein described.

The speed changer consists of a box-like structure having two side plates 19 and 20 held at a fixed distance apart by tubular spacers 21 and secured by bolts 22 passing through the separators and the plates 19 and 20.

Side plates 19 and 20 serve as bearings for input shaft 23 and output shaft 24 as well as for a counter shaft 25. (See FIG. 5.) Shafts 23 and 24 extend through and beyond the plates 19 and 20 and female elements of the pin and slot couplings are mounted, one each, on their outboard ends and are indicated by 26, 27, 28 and 29 respectively.

Input shaft 23 carries a spur gear 30 and output shaft 24 carries a spur gear 31. Counter shaft 25 carries spur gears 32 and 33. (These gears and their arrangement is best seen in FIG. 3.) Spur gear 31 meshes with spur gear 32, spur gear 33 meshes with spur gear 30.

Plates 19 and 20 are provided with holes 34 and 35 while plate 20 is provided with holes 36 and 37 to receive rods 17 and 18.

Several speed changers will be used as is desired. Each is similarly constructed, only the gear ratio being different in each one. For example, the same speed changer may provide a gear ratio of either two or one half, depending on which way the changer is applied to the adapter 2. Thus each speed changer used will provide two different gear ratios for the mechanism 1.

To mount a speed changer, all that is necessary is to slide the plates 19 and 20 on the rods 17 and 18. If desired, set screws 38 may be employed to secure the plates thereon. Nuts (not shown) could also be used if the inboard ends of rods 17 and 18 are threaded.

When the speed of the chart roller 12 is desired to be changed, the speed changer 3 is removed from the rods 17 and 18, turned around and reinserted on the rods 17 and 18. The male and female elements of the pin and slot couplings will automatically mate.

With the present invention, motion of the chart mechanism 1 need not be stopped to change its speed.

It is apparent that the present invention provides an ingenious means to quickly change the speed of mechanisms and has a wide range of use, since its application to rotating shafts makes it capable of use in many mechanisms.

While only preferred forms of the invention are shown and described, other forms are contemplated and numerous changes and modifications may be made therein without departing from the spirit of the invention as set forth in the appended claims.

What is claimed is:

1. In combination with a chain drive for a recording mechanism including a supporting frame, a chart driving roller journaled in said frame, an adapter for attachment on said frame, said adapter having a driving shaft, an idler shaft spaced from said driving shaft and a male coupling carried by one end of each said shafts and a detachable speed changing gear unit having female couplings adapted to be mated with said male couplings on said shafts whereby said idler shaft is driven by said driving shaft.

2. A device as set forth in claim 1 wherein said adapter comprises a mounting plate, a bearing plate secured on said mounting plate, a sprocket carried by the outboard end of said idler shaft, and a pair of spaced mounting rods secured to said bearing plate for the support of said gear cluster unit when said gear unit is in coupled relation with said shafts.

3. A device as set forth in claim 1 wherein said speed changing gear unit comprises a pair of plates, a series of spacers adapted to secure said plates in spaced relation, an input shaft journaled in said plates and extending beyond therefrom, an output shaft journaled in said plates and extending beyond therefrom, a female coupling carried by each end of said input and output shafts for mating with said male couplings on said driving and idler shafts, a counter shaft journaled in said plates and meshing spur gears carried by said input, output and counter shafts, said spur gears having a predetermined ratio whereby said gear unit may be mounted at either of its ends to said adapter and permit at least two speed differentials between said driving and said idler shafts.

4. In combination with a chain drive for a recording mechanism having a supporting frame and a chart driving roller journaled therein; an adapter for attachment on said frame, said adapter including a bearing plate, a driving shaft journaled in said plate, an idler shaft journaled in said plate and in driving connection with said roller, a male coupling element carried by the inboard side of said driving and idler shafts, a pair of spaced mounting rods secured to the inboard side of said plate and a speed changing gear cluster unit for reversible attachment to said adapter, said unit including a pair of spaced supporting plates, input and output shafts journaled in said plates, and a female coupling element carried by each end of said last named shafts, there being a pair of aligned holes in said supporting plates and adapted to receive said mounting rods therethrough when said unit is being mounted on said adapter whereby said male and female elements will be aligned for coupling.

References Cited by the Examiner
UNITED STATES PATENTS

| | | | |
|---|---|---|---|
| 2,510,575 | 6/1950 | Hathaway | 346—145 |
| 2,517,910 | 8/1950 | Miller | 74—325 |
| 2,701,479 | 2/1955 | Kuntny | 346—139 X |
| 3,001,409 | 9/1961 | Fumetti. | |

RICHARD B. WILKINSON, *Primary Examiner.*

STEPHEN J. TOMSKY, *Examiner.*

J. W. HARTARY, *Assistant Examiner.*